US012724441B2

(12) United States Patent
Hwang et al.

(10) Patent No.: US 12,724,441 B2
(45) Date of Patent: Sep. 1, 2026

(54) LDO REGULATOR CIRCUIT APPARATUS CAPABLE OF ATTENUATING SUPPLY VOLTAGE NOISE

(71) Applicant: FOUNDATION OF SOONGSIL UNIVERSITY-INDUSTRY COOPERATION, Seoul (KR)

(72) Inventors: Young Ha Hwang, Seoul (KR); Hee Cheol Joo, Seoul (KR); Yoo Chang Kim, Seoul (KR); Seung Chae Jung, Seoul (KR); Seung Hoon Yi, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 192 days.

(21) Appl. No.: 18/746,653

(22) Filed: Jun. 18, 2024

(65) Prior Publication Data

US 2025/0271886 A1 Aug. 28, 2025

(30) Foreign Application Priority Data

Feb. 26, 2024 (KR) ........................ 10-2024-0026924

(51) Int. Cl.
*G05F 1/575* (2006.01)
*G05F 1/571* (2006.01)

(52) U.S. Cl.
CPC .............. *G05F 1/575* (2013.01); *G05F 1/571* (2013.01)

(58) Field of Classification Search
CPC ................................ G05F 1/575; G05F 1/571
See application file for complete search history.

(56) References Cited

U.S. PATENT DOCUMENTS

2019/0258282 A1* 8/2019 Magod Ramakrishna .................. G05F 1/575

OTHER PUBLICATIONS

Yan Lu, Cheng Li, Yan Zhu, Mo Huang, Seng-Pan U, Rui Martins, "A 312 ps response-time LDO with enhanced super source follower in 28 nm CMOS", Aug. 4, 2016, Electronic Letters, vol. 52, No. 16, pp. 1368-1370.*

* cited by examiner

*Primary Examiner* — Harry R Behm
(74) *Attorney, Agent, or Firm* — Stein IP LLC

(57) ABSTRACT

An LDO regulator circuit apparatus capable of removing supply voltage noise is disclosed. The LDO regulator circuit apparatus capable of removing supply voltage noise comprises a flipped voltage follower (FVF) regulator circuit unit having a pass transistor $M_{PASS}$ configured to adjust a supply voltage to output an output voltage; an error amplifying circuit unit configured to receive and compare a reference signal ($V_{REF}$) and a feedback voltage ($V_{OUT\_DIV}$), wherein the feedback voltage is fed back through the output voltage through a feedback loop; a common gate (CG) circuit unit configured to amplify a feedback loop gain of the flipped voltage follower (FVF) regulator circuit unit; and a super source follower circuit unit configured to buffer an output of the CG circuit unit and transmit it to a gate node of the pass transistor ($M_{PASS}$).

6 Claims, 14 Drawing Sheets

Prior Art

Prior Art

Prior Art

Prior Art

Prior Art

FIG. 14

<table>
<tr><td colspan="2"></td><td colspan="2">THIS WORK</td><td colspan="2">TPE 2019<br>[12]</td><td colspan="2">TCAS-1 2020<br>[13]</td></tr>
<tr><td colspan="2">LDO ARCHITECTURE</td><td colspan="2">FVF LDO</td><td colspan="2">FVF LDO</td><td colspan="2">FVF LDO</td></tr>
<tr><td colspan="2">TRANSIENT ENHANCED?</td><td colspan="2">O<br>(CLASS-AB CONTROL)</td><td colspan="2">X<br>(FEEDFORWARD)</td><td colspan="2">X</td></tr>
<tr><td colspan="2">FULL-SPECTRUM PSR?</td><td colspan="2">O<br>(GAIN-BOOSTED SSF)</td><td colspan="2">X</td><td colspan="2">X</td></tr>
<tr><td colspan="2">TECHNOLOGY</td><td colspan="2">28</td><td colspan="2">65</td><td colspan="2">65</td></tr>
<tr><td colspan="2">$C_L$ [nF]</td><td colspan="2">10</td><td colspan="2">2</td><td colspan="2">0.1</td></tr>
<tr><td colspan="2">$V_{IN}$ [V]</td><td colspan="2">1</td><td colspan="2">0.6 - 1.1</td><td colspan="2">1.05</td></tr>
<tr><td colspan="2">$V_{OUT}$ [V]</td><td colspan="2">0.9</td><td colspan="2">0.4 - 0.9</td><td colspan="2">0.9</td></tr>
<tr><td colspan="2">$V_{DO}$ [V]</td><td colspan="2">0.1</td><td colspan="2">0.2</td><td colspan="2">0.15</td></tr>
<tr><td colspan="2">$I_{LOAD\_MAX}$ [mA]</td><td colspan="2">150</td><td colspan="2">50</td><td colspan="2">20</td></tr>
<tr><td colspan="2">UNDERSHOOT / OVERSHOOT VOLTAGE [mV]</td><td colspan="2">23 / 33</td><td colspan="2">2.5 / 2</td><td colspan="2">6.25 / 5</td></tr>
<tr><td colspan="2">SETTING TIME [NS]<br>(<1% ERROR) (@$T_{TR}$)</td><td colspan="2">5.1</td><td colspan="2">0.9</td><td colspan="2">100</td></tr>
<tr><td rowspan="4">PSR [dB]<br>@ $I_{LOAD}$</td><td>10K</td><td>-21.3</td><td rowspan="4">@150mA</td><td>-34*</td><td rowspan="2">@ 50mA</td><td>-54</td><td rowspan="2">@ 20mA</td></tr>
<tr><td>10 MHz</td><td>-13.3</td><td>-28*</td><td>-6</td></tr>
<tr><td>100 MHz</td><td>-8.5</td><td colspan="2">N/A</td><td colspan="2">N/A</td></tr>
<tr><td>1 GHz</td><td>-23</td><td colspan="2">N/A</td><td colspan="2">N/A</td></tr>
<tr><td colspan="2">FoM [mV] **</td><td colspan="2">0.145</td><td colspan="2">0.789</td><td colspan="2">2.844</td></tr>
<tr><td colspan="2">ACTIVE AREA [$mm^2$]</td><td colspan="2">0.041</td><td colspan="2">0.008</td><td colspan="2">0.01</td></tr>
</table>

LDO REGULATOR CIRCUIT APPARATUS CAPABLE OF ATTENUATING SUPPLY VOLTAGE NOISE

CROSS-REFERENCE TO RELATED APPLICATIONS

This application claims the benefit of Korean Application No. 10-2024-0026924 filed on Feb. 26, 2024, in the Korean Intellectual Property Office. All disclosures of the document named above are incorporated herein by reference.

TECHNICAL FIELD

The present invention relates to an LDO regulator circuit apparatus capable of attenuating supply voltage noise in all frequency bands.

BACKGROUND ART

Recent changes in the specifications of DRAM modules show that the supply voltage is gradually decreasing while the data transfer speed is increasing. If there is noise in the supply voltage, jitter occurs that degrades the integrity of the clock signal. As the supply voltage decreases and the data transfer speed increases, the clock transition timing becomes more unstable, and there is a problem that it is becoming increasingly difficult to secure a stable data margin in the DRAM memory interface (DDR). Accordingly, the importance of technologies to address the effects of supply voltage noise that impairs the integrity of clock signals is increasing.

There are three major conventional technologies for reducing the effect of supply voltage noise on clock signals.

First, there is a method of reducing the effect of supply voltage noise by using a separate compensation loop in the phase-locked loop (PLL) where the clock is generated. If there is noise in the supply voltage and the supply voltage becomes unstable, the current used by the oscillator that generates the clock changes, which changes the frequency of the clock and increases the noise (jitter) of the clock. Thus, a circuit structure is needed to ensure that the current used by the oscillator does not vary with respect to the supply voltage, and this is disclosed in "TCAS-2 2022, A 1.05-to-3.2 GHZ All-Digital PLL for DDR5 Registering Clock Driver With a Self-Biased Supply-Noise-Compensating Ring DCO." The PLL block diagram and clock frequency change results using this are shown in FIG. 1.

This related art has a limitation in that it cannot prevent the corresponding clock frequency change at that moment when the supply voltage changes instantaneously, and there is a limitation in that it cannot eliminate the effect of supply voltage noise in a high-frequency band beyond the PLL loop bandwidth.

Even in the process of clock distribution, clock jitter is worsened by noise in the supply voltage, and the second related art is a method of reducing the effect of supply voltage noise by appropriately adjusting the delay in the clock distribution path through a separate compensation loop. It is presented in "JSSC 2023, A Supply-Noise-Induced Jitter Canceling Adaptive Filter for LPDDR5 Mobile DRAM" (See FIG. 2).

However, in the related art, if the supply voltage noise in the high-frequency band remains, even if the delay is adjusted through the delay control loop (DLL), the supply voltage noise in the high-frequency band exceeding the DLL loop bandwidth is not filtered and clock jitter transmitted gets worsened, and thus there are limitations in securing stable data margin (horizontal, vertical eye margin) in the data DRAM memory interface (DDR).

The third related art is a method of fundamentally reducing the noise of the supply voltage itself by regulating the voltage supplied to the circuit that generates or distributes the clock using a circuit called LDO. FIG. 3 illustrates a structure adopting the PLL of the DDR RCD chip and an LDO circuit for rectifying the supply voltage of the clock driver circuit.

As shown in FIG. 4, even if there is noise in the existing supply voltage (V_IN), the noise in the output voltage (V_OUT) output through the LDO circuit below is reduced by the operation of the LDO circuit, and this is transmitted to the clock-related circuit. The LDO circuit can rectify the output voltage close to the reference voltage (V_REF) through a negative feedback loop.

However, the LDO in FIG. 4 also rectifies the output voltage through a loop that has a limited response speed, so it has the disadvantage of limiting the bandwidth which can reduce the effect of supply voltage noise.

FIG. 5 shows a frequency response in which supply voltage noise is not properly removed around 10 MHz when an example of the LDO circuit of FIG. 4 is implemented. The supply voltage noise removal ratio can be evaluated as Power supply rejection (PSR)=20*log(V_OUT/V_IN) [dB], where 0 dB is when the incoming noise goes out without being reduced, the displayed part is around 0 dB, and the lower the value goes to a negative number, the more noise is removed.

In addition, the loop gain of the LDO generally decreases when the load current is large compared to when the load current is small, and there is a downside in that it is more difficult to achieve full-spectrum power supply rejection (the ability to limit supply voltage noise across all frequency bands).

DISCLOSURE

Technical Issues

The present disclosure is intended to provide an LDO regulator circuit apparatus capable of attenuating supply voltage noise in all frequency bands.

In addition, the present invention can reduce supply voltage noise across all frequency bands even when the load current is greater than 100 mA, and it relates to an LDO regulator circuit apparatus capable of attenuating supply voltage noise in all frequency bands, which can further improve transient response speed through this.

In addition, the present invention relates to an LDO regulator circuit apparatus capable of attenuating supply voltage noise in all frequency bands, in which transient response can be improved in both overshoot situations where the load current is small and undershoot situations where the load current is large by controlling the gate node of the pass transistor using the class-AB structure.

Technical Solution

According to one aspect of the present invention, an LDO regulator circuit apparatus capable of attenuating supply voltage noise is provided.

According to one embodiment of the present invention, an LDO regulator circuit apparatus capable of attenuating supply voltage noise may comprise a flipped voltage follower (FVF) regulator circuit unit having a pass transistor $M_{PASS}$ configured to adjust a supply voltage to output an output voltage; an error amplifying circuit unit configured to receive and compare a reference signal ($V_{REF}$) and a feedback voltage ($V_{OUT\_DIV}$), wherein the feedback voltage is fed back through the output voltage through a feedback loop; a common gate (CG) circuit unit configured to amplify a feedback loop gain of the flipped voltage follower (FVF) regulator circuit unit; and a super source follower circuit unit configured to buffer an output of the CG circuit unit and transmit it to a gate node of the pass transistor ($M_{PASS}$).

The flipped voltage follower (FVF) regulator circuit unit may comprise a transistor $M_{CTRL}$ whose gate node is an input terminal of the flipped voltage follower (FVF) regulator circuit unit; and a transistor $M_{BIAS}$ operating as a current source, wherein a drain node of the pass transistor $M_{PASS}$ is connected to a source node of a transistor $M_{CTRL}$, a drain node of the transistor $M_{CTRL}$ is connected to a drain node of a transistor $M_{BIAS}$, and a source node of the transistor $M_{BIAS}$ is connected to ground.

The LDO regulator circuit apparatus may further comprise a control circuit unit configured to transmit an output of the error amplifying circuit unit to a gate node of the transistor $M_{CTRL}$ according to a bias voltage, wherein the control circuit unit has a transistor $M_{N1}$ and a transistor $M_{P1}$, a bias voltage ($V_{B1}$) is applied to a source node of the transistor $M_{P1}$, a gate node of the transistor $M_{P1}$ is connected to the gate node of the transistor $M_{CTRL}$, a gate node of the transistor $M_{N1}$ receives an output signal of the error amplifying circuit unit, the source node is connected to ground, and the drain node is connected to a drain node of the transistor $M_{P1}$.

The CG (common gate) circuit unit may comprise a transistor $M_{N2}$, wherein a source node of the transistor $M_{N2}$ is connected to a drain node of the transistor $M_{CTRL}$, and an output of the drain node of the transistor $M_{CTRL}$ is amplified according to a bias voltage ($V_{B2}$) applied to the gate node and transmitted to the super source follower circuit unit.

The LDO regulator circuit apparatus further comprises a transistor $M_{N4}$ configured to buffer an output of the CG circuit unit to an input of the super source follower circuit unit, wherein the super source follower circuit unit comprises transistors $M_{P4}$ and $M_{P5}$ configured to receive a supply voltage at a source node, transistors $M_{N5}$ and $M_{N6}$ whose source nodes are connected to ground, and a transistor $M_{P3}$ whose gate node is connected to a source node of the transistor $M_{N4}$, wherein a contact node, in which a drain node of the transistor $M_{P4}$ and a source node of the transistor $M_{P3}$ are connected, and a contact node, in which a drain node of the transistor $M_{P5}$ and a drain node of the transistor $M_{N6}$ are connected, are respectively connected to a gate node of the pass transistor $M_{PASS}$.

According to another embodiment of the present invention, an LDO regulator circuit apparatus capable of attenuating supply voltage noise may comprise a flipped voltage follower (FVF) regulator circuit unit having a pass transistor $M_{PASS}$ configured to adjust a supply voltage to output an output voltage; an error amplifying circuit unit configured to receive and compare a reference signal ($V_{REF}$) and a feedback voltage ($V_{OUT\_DIV}$), wherein the feedback voltage is fed back through the output voltage through a feedback loop; a common gate (CG) circuit unit configured to amplify a feedback loop gain of the flipped voltage follower (FVF) regulator circuit unit; a super source follower circuit unit configured to buffer an output of the CG circuit unit and transmit it to a gate node of the pass transistor ($M_{PASS}$); and a class AB circuit unit located between the pass transistor $M_{PASS}$ and the super source follower circuit and configured to pull up or pull down a gate node of the pass transistor $M_{PASS}$ in an overshoot or undershoot situation of the output voltage.

The class AB circuit unit may comprise a first switch transistor configured to be turned on in an overshoot situation of the output voltage and pull up a gate node of the pass transistor $M_{PASS}$ by generating a pull-up signal through an overshoot suppression circuit unit on a first path; and a first switch transistor configured to be turned on in an undershoot situation of the output voltage and pull down a gate node of a pass transistor $M_{PASS}$ by boosting a gain of a fast loop.

Advantageous Effects

By providing an LDO regulator circuit apparatus capable of attenuating supply voltage noise according to an embodiment of the present invention, supply voltage noise can be reduced across all frequency bands even when the load current is greater than 100 mA, thereby further improving transient response speed.

Additionally, the present invention can control the gate node of the pass transistor using a class-AB structure to improve transient response in both overshoot situations where the load current is small and undershoot situations where the load current is large.

DESCRIPTION OF DRAWINGS

These and/or other aspects will become apparent and more readily appreciated from the following description of the embodiments, taken in conjunction with the accompanying drawings in which:

FIG. 14 is a diagram showing the results of comparing the performance of the LDO regulator circuit apparatus capable of attenuating supply voltage noise of FIG. 9 with the prior art.

DETAILED DESCRIPTION OF EMBODIMENTS

As used herein, singular expressions include plural expressions unless the context clearly dictates otherwise. In this disclosure, terms such as "consists of" or "comprises" should not be construed as necessarily including all of the various components or steps described in the disclosure, and it should be interpreted as not including some of the components or steps may, or including additional components or steps. In addition, terms such as ". . . unit" and "module" used in the disclosure refer to a unit that processes at least one function or operation, which may be implemented as hardware or software, or as a combination of hardware and software.

Hereinafter, embodiments of the present invention will be described in detail with reference to the attached drawings.

Figure 1:
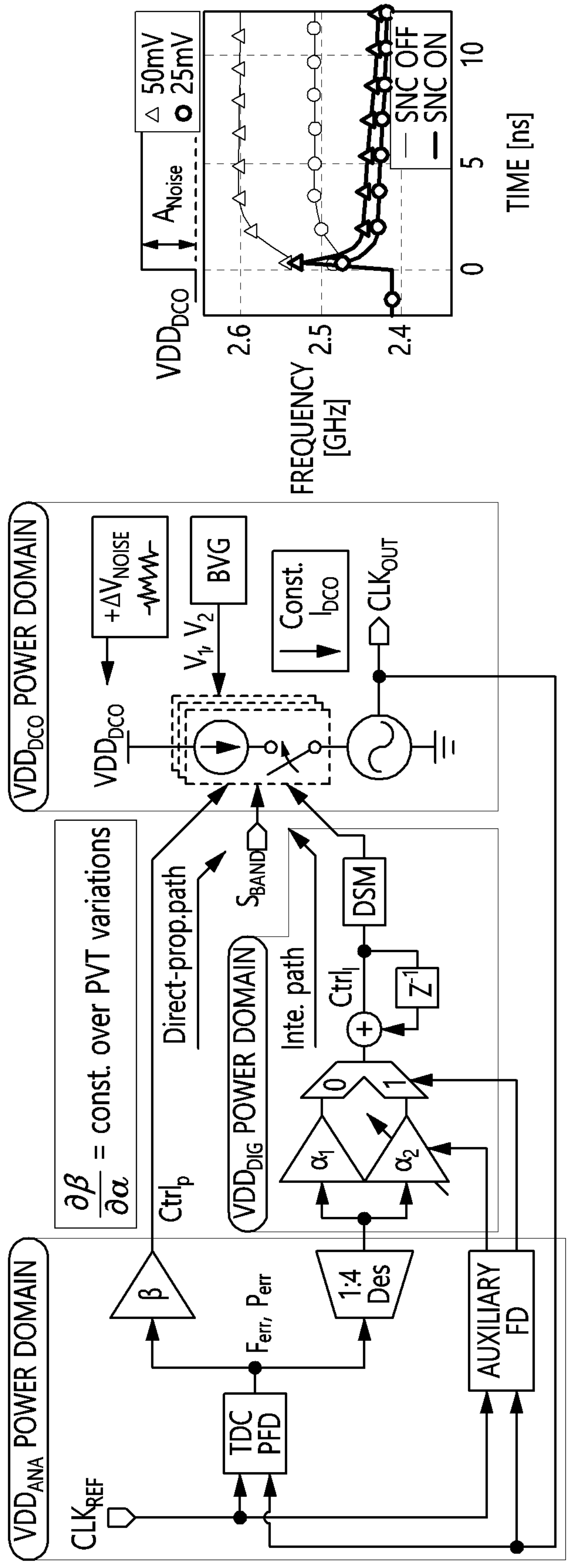
FIGS. 1 to 5 are diagrams for explaining the prior art.
Figure 2:
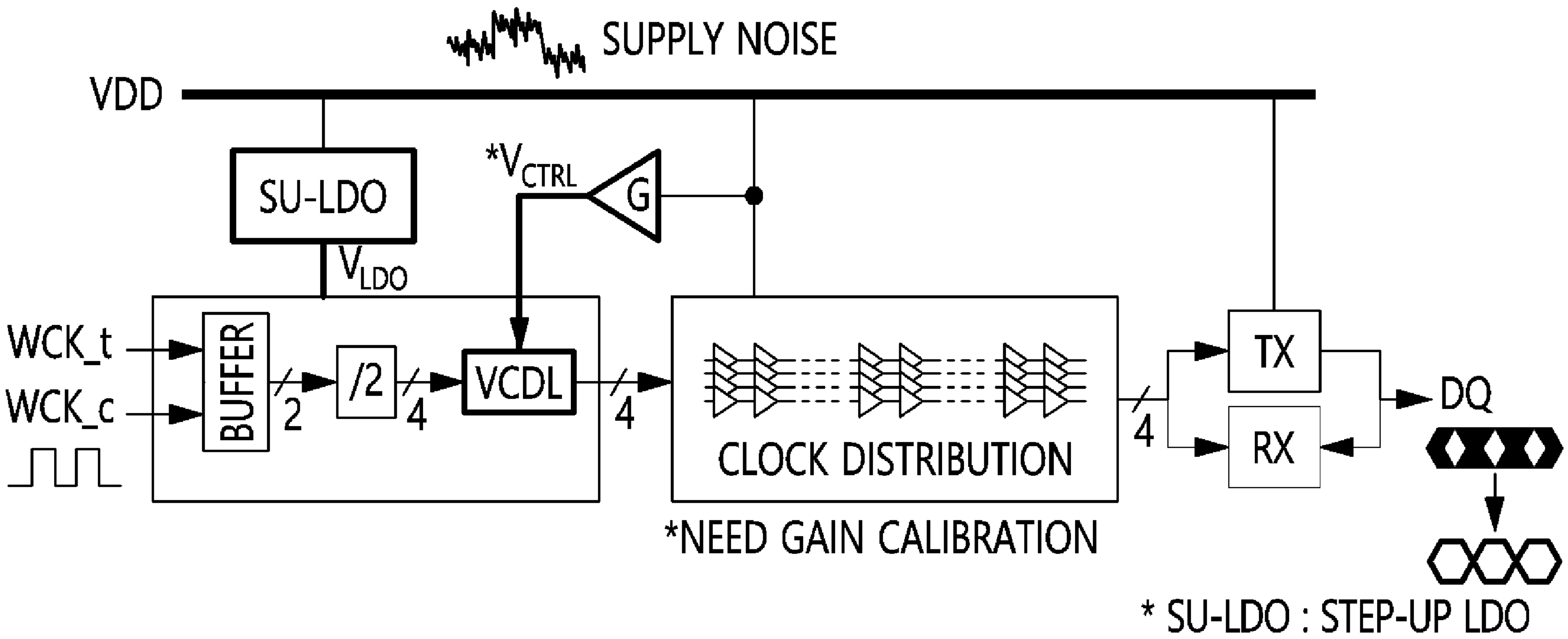
Figure 3:
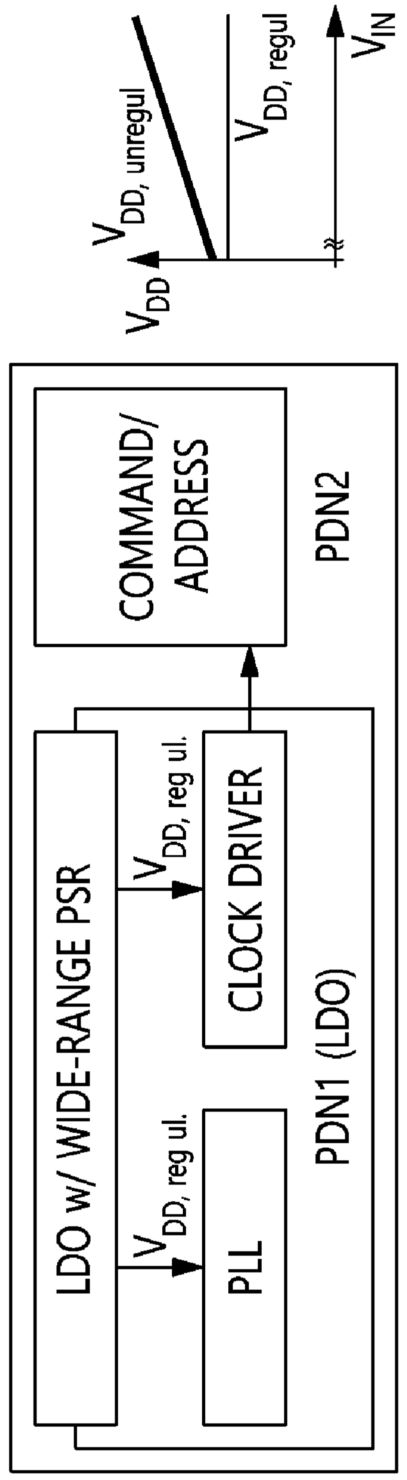
Figure 4:
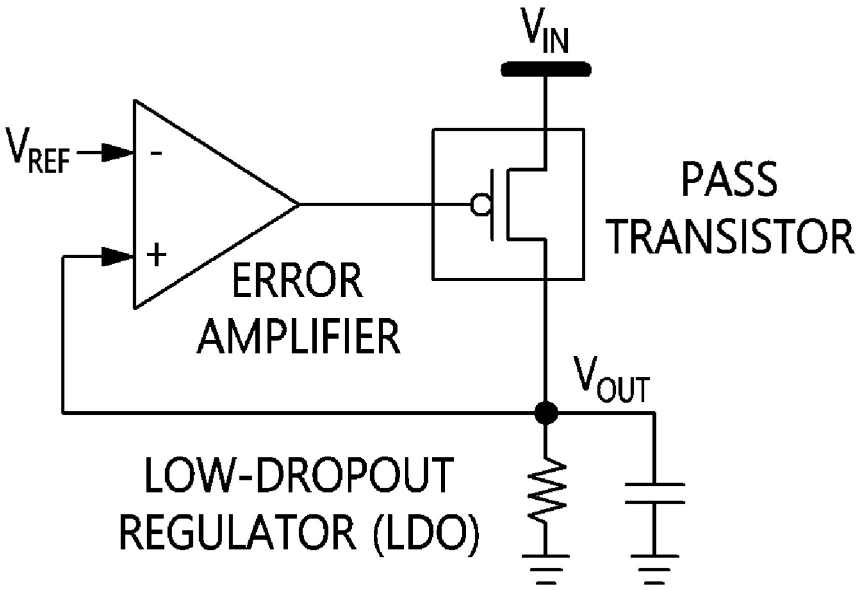
Figure 5:
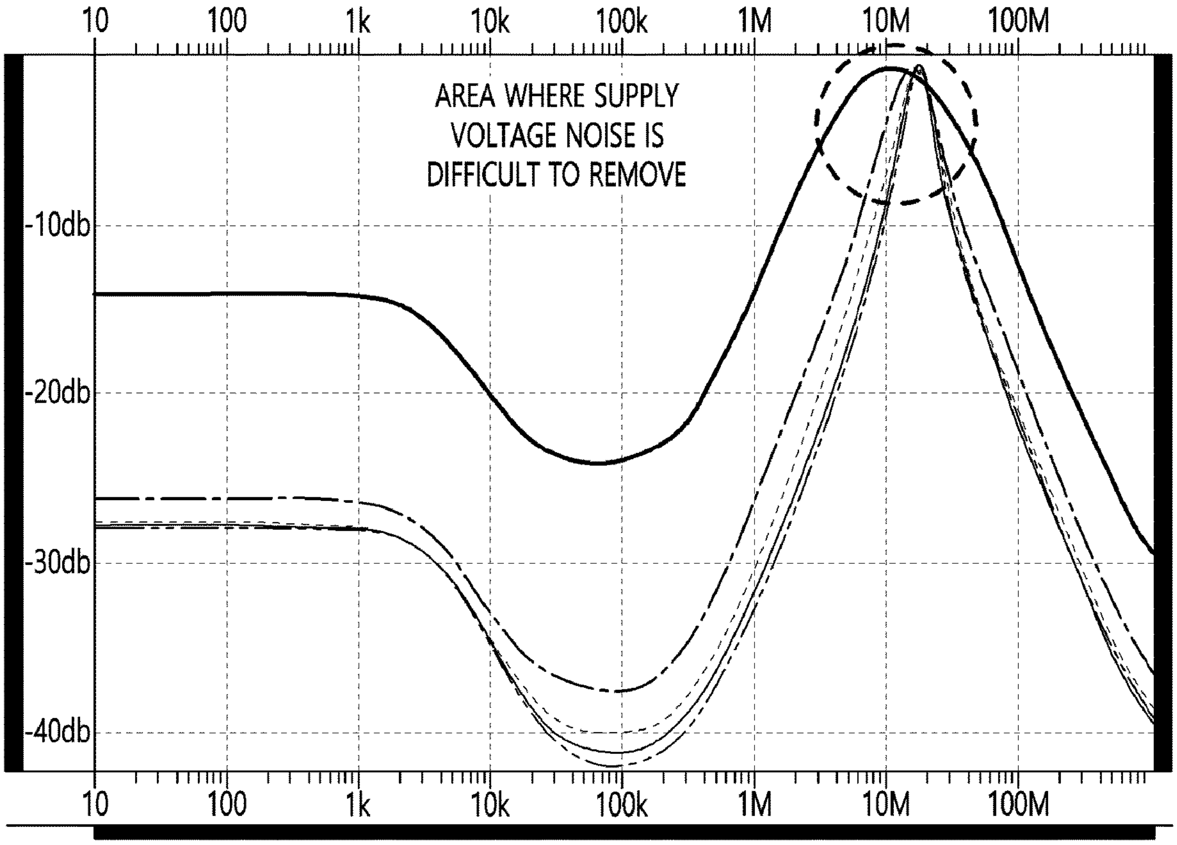
Figure 6:
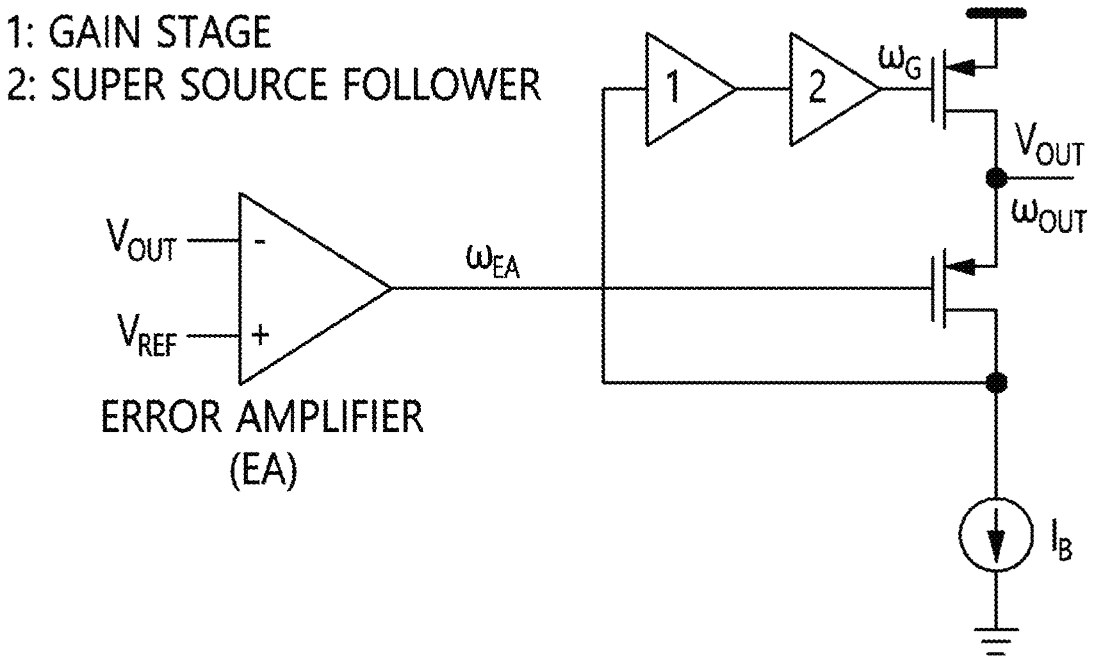
FIG. 6 is a diagram showing an LDO regulator circuit apparatus capable of attenuating supply voltage noise according to an embodiment of the present invention.
Figure 7:
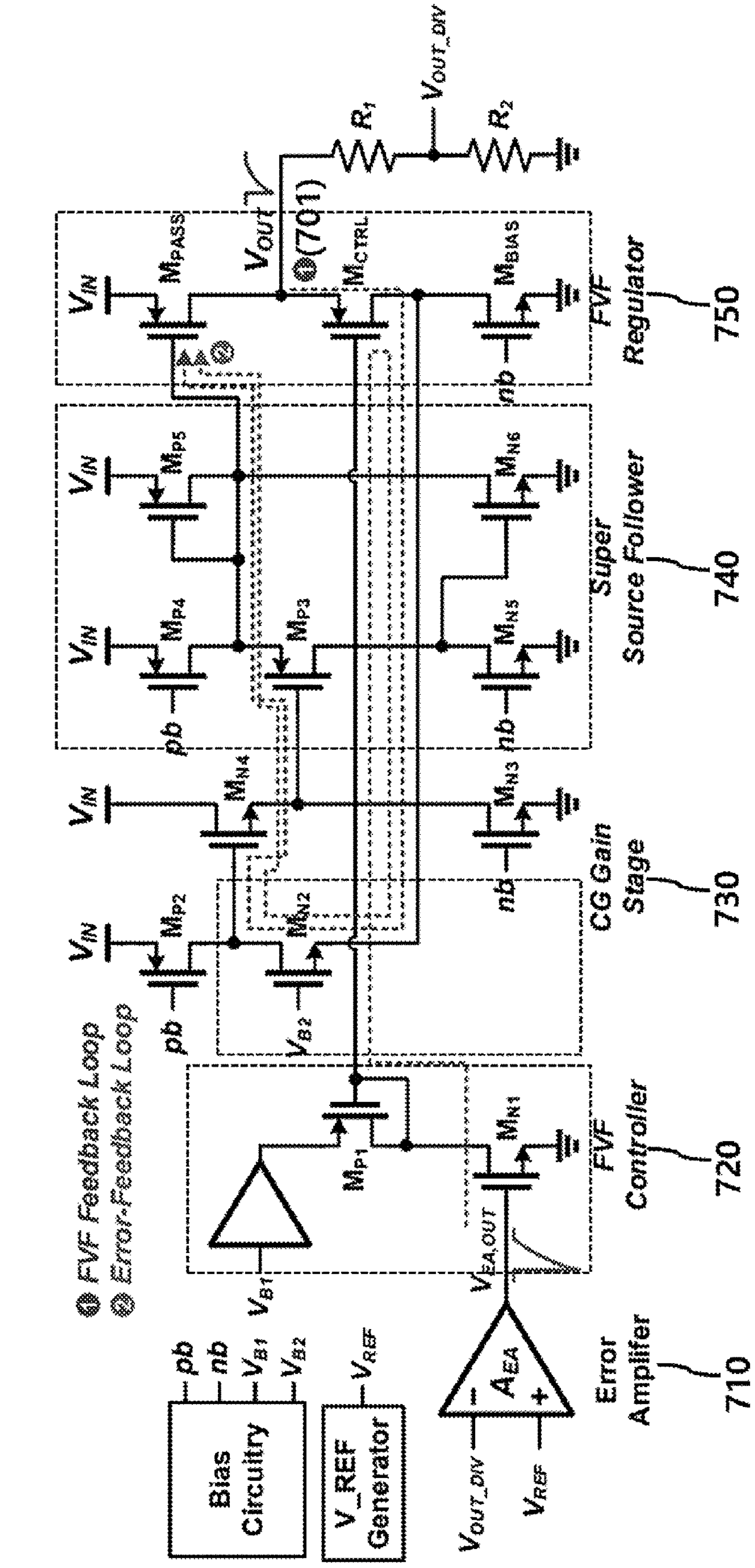
FIG. 7 is a detailed circuit diagram of FIG. 6.

FIG. 6 is a diagram illustrating an LDO regulator circuit apparatus capable of attenuating supply voltage noise according to an embodiment of the present invention, and FIG. 7 is a diagram illustrating a detailed circuit diagram of FIG. 6.

Referring to FIGS. 6 and 7, the LDO regulator circuit apparatus capable of attenuating supply voltage noise according to an embodiment of the present invention comprises an error amplifying circuit unit 710, a control circuit unit 720, a CG circuit unit 730, and a super source follower (SSF) circuit unit 740 and a flipped voltage follower (FVF) regulator circuit unit 750.

The error amplifying circuit unit 710 receives a reference signal (voltage) ($V_{REF}$) through a negative input terminal, receives a feedback voltage ($V_{OUT\_DIV}$) through a positive input terminal, and then compares the reference signal ($V_{REF}$) and the feedback voltage ($V_{OUT\_DIV}$) to output an output signal. The signal output by the error amplifying circuit unit 710 is applied to the control circuit unit 720. The feedback voltage ($V_{OUT\_DIV}$) is a voltage fed back from the output of the FVF regulator circuit unit 750 through a feedback loop.

Accordingly, the output from the error amplifying circuit unit 710 may include information about changes in the output voltage ($V_{OUT}$) output from the output node of the FVF regulator circuit unit 750. For example, when the output voltage ($V_{OUT}$) changes, the feedback voltage ($V_{OUT\_DIV}$) fed back through the feedback loop also changes, and the error amplifying circuit unit 710 may generate an output signal according to the changed feedback voltage ($V_{OUT\_DIV}$).

The control circuit unit 720 operates as a level shifter and may transmit the output signal of the error amplifying circuit unit 710 to the gate node of the transistor $M_{ctrl}$ according to the bias voltage $V_{B1}$ applied to the control circuit unit 720.

As shown in FIG. 7, the control circuit unit 720 may comprise transistors $M_{P1}$ and $M_{N1}$.

In more detail, the output node ($V_{EA\_OUT}$) of the error amplifying circuit unit 710 may be connected to the gate node of transistor $M_{N1}$, the source node of $M_{N1}$ may be connected to the ground, and the drain node may be connected to the drain node of $M_{P1}$. Additionally, a bias ($V_{B1}$) may be input to the source node of transistor $M_{P1}$, and the gate node of $M_{P1}$ may be connected to the gate node of transistor $M_{ctrl}$.

Due to this, the control circuit unit 720 may transmit the output signal of the error-amplifying circuit unit 710 to the gate node of the transistor $M_{ctrl}$, which serves as the input terminal of the FVF regulator circuit unit 750, according to the bias voltage ($V_{B1}$).

The common gate (CG) circuit unit 730 amplifies the feedback loop gain of the FVF regulator circuit unit 750 and transmits it to the SSF circuit unit 740.

For example, the CG circuit unit 730 may comprise transistor $M_{N2}$. More specifically, the source node of transistor $M_{N2}$ may be connected to the drain node of transistor $M_{ctrl}$, and a bias voltage ($V_{B2}$) may be applied through the gate node. Therefore, the output of the drain node of the transistor $M_{ctrl}$ may be amplified according to the bias voltage ($V_{B2}$) applied to the gate node of the transistor $M_{N2}$ and transmitted to the SSF circuit unit 740.

Figure 8:
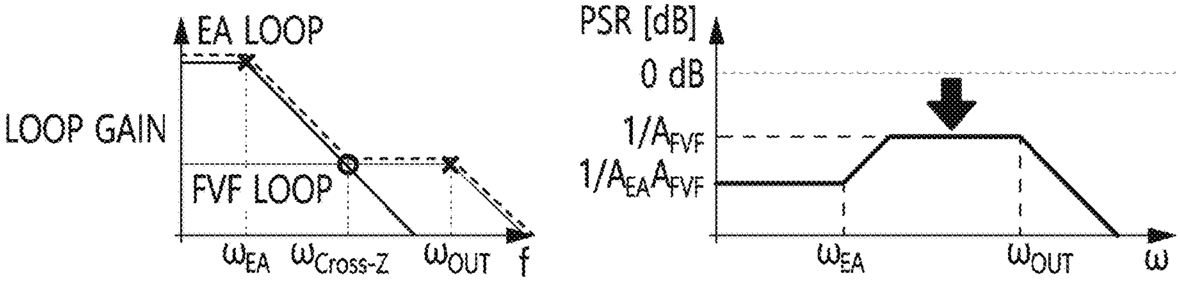
FIG. 8 is a diagram showing the loop gain of the FVF LDO circuit and the resulting PSR frequency response.

FIG. 8 is a diagram showing the loop gain of the FVF LDO circuit and the resulting PSR frequency response.

When noise at the supply voltage ($V_{\_IN}$) connected to the source node of the pass transistor $M_{PASS}$ is dominant, the loop gain and PSR frequency response of the FVF LDO circuit appear as shown in FIG. 8.

To achieve PSR in all frequency bands, the loop gain should be increased quickly.

In one embodiment of the present invention, as described above, the fast loop gain of the FVF regulator circuit unit 750 can be achieved through the CG circuit unit 730.

The SSF circuit unit 740 operates as a buffer for the gate node of the pass transistor $M_{PASS}$.

In more detail, the SSF circuit unit 740 may comprise transistors $M_{P3}$, $M_{P4}$, $M_{P5}$, $M_{N4}$, $M_{N5}$, and $M_{N6}$.

Transistor $M_{N4}$ serves as an input buffer. That is, transistor $M_{N4}$ can buffer the output of the CG circuit unit 730 to the input of the SSF circuit unit 740. Accordingly, the gate node of transistor $M_{N4}$ may be connected to the drain node of transistor $M_{N2}$, a supply voltage may be applied to the drain node, and the source node may be connected to the gate node of transistor $M_{P3}$.

Additionally, the transistor $M_{P4}$ may receive a supply voltage at the source node, the drain node may be connected to the source node of transistor $M_{P3}$, and the gate node may be connected to the source node of transistor $M_{N4}$.

In addition, transistor $M_{P5}$ receives a supply voltage at a source node, the gate node is connected to a contact node where the drain node of transistor $M_{P4}$ and the source node of transistor $M_{P3}$ are connected, and the drain node is connected to the drain node of transistor $M_{N6}$.

Additionally, the source nodes of transistor $M_{N5}$ and transistor $M_{N6}$ are connected to the ground, and a bias voltage (nb) may be applied to each gate node.

Additionally, the contact node where the drain node of transistor $M_{P4}$ and the source node of transistor $M_{P3}$ are connected, and the contact node where the drain node of transistor $M_{P5}$ and the drain node of transistor $M_{N6}$ are connected may each be connected to the gate node of pass transistor $M_{PASS}$.

Through this configuration, the SSF circuit unit 740 is used as a buffer for the gate node of the pass transistor $M_{PASS}$, and the fast loop of the LDO may improve the safety of the LDO operation and rectifier loop by sending the output ($w_G$) of the SSF circuit unit 740, which is a pole reduced by parasitic capacitance, to a higher frequency band than the output voltage ($V_{OUT}$).

The FVF regulator circuit unit 750 is an LDO circuit that outputs an output voltage by removing noise from the supply voltage.

The FVF regulator circuit unit 750 has a pass transistor $M_{PASS}$ that adjusts the supply voltage to output an output voltage from which noise of the supply voltage has been removed, and has a fast loop 701.

As described above, the gain of the fast loop 701 may be amplified through the CG circuit 730 and then transmitted to the gate node of the pass transistor $M_{PASS}$ through the SSF circuit 740.

The FVF regulator circuit unit 750 may further comprise transistor $M_{CTRL}$ and transistor $M_{BIAS}$. Here, the gate node of the transistor $M_{CTRL}$ may be connected to the output node of the control circuit unit 720. Additionally, the source node of transistor $M_{CTRL}$ is connected to the drain node of pass transistor $M_{PASS}$, and the drain node is connected to the drain node of transistor $M_{BIAS}$. A bias voltage (nb) is applied to the gate node of the transistor $M_{BIAS}$, and the source node is connected to the ground. As described above, the contact point of the drain node of transistor $M_{CTRL}$ and the drain node of transistor $M_{BIAS}$ may be connected to the source node of transistor $M_{N2}$ to amplify the gain of the fast loop 701 of the FVF regulator circuit 750 to achieve PSR in all bands.

Figure 9:
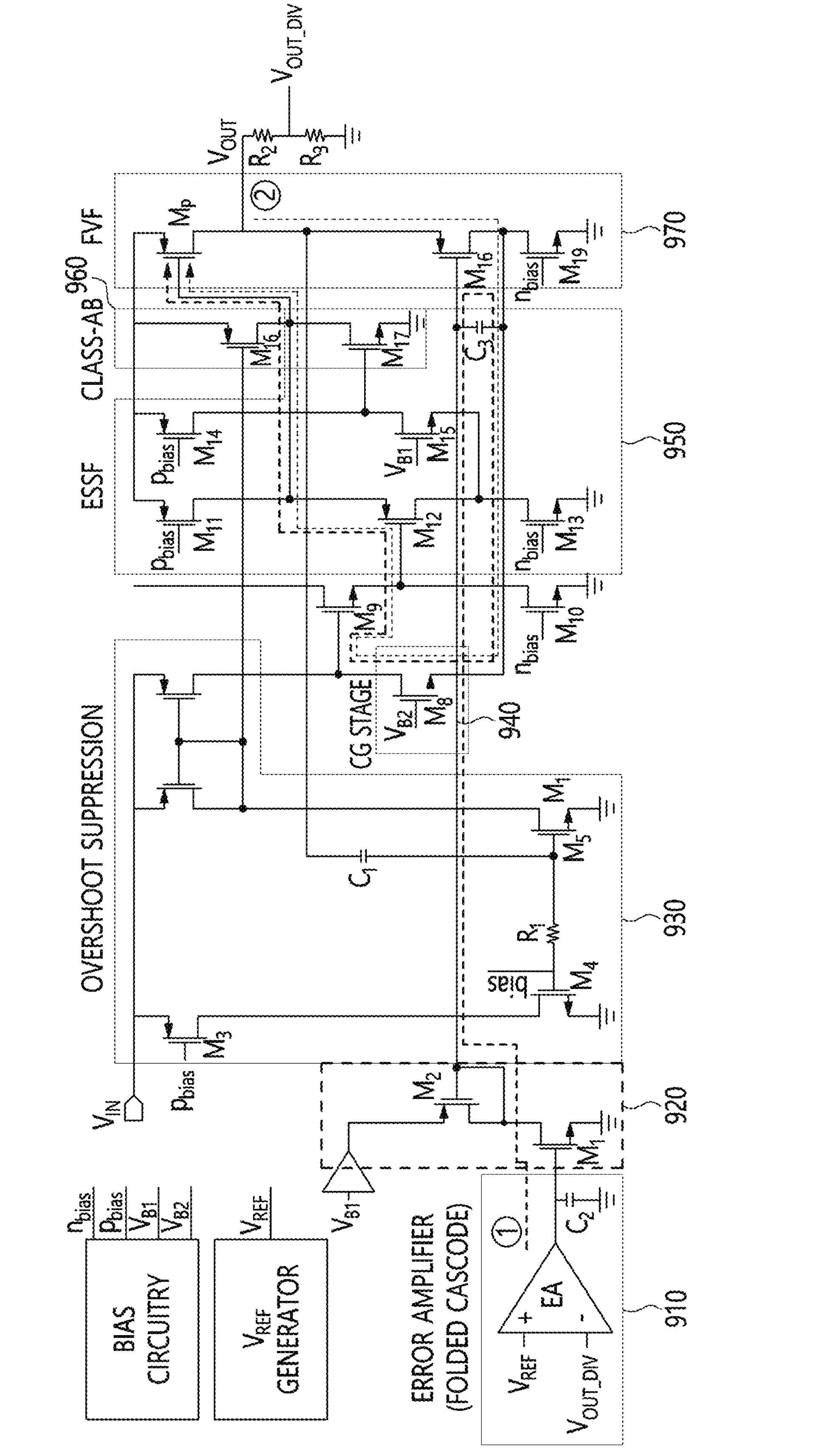
FIG. 9 is a diagram showing an LDO regulator circuit apparatus capable of attenuating supply voltage noise according to another embodiment of the present invention.
Figure 10:
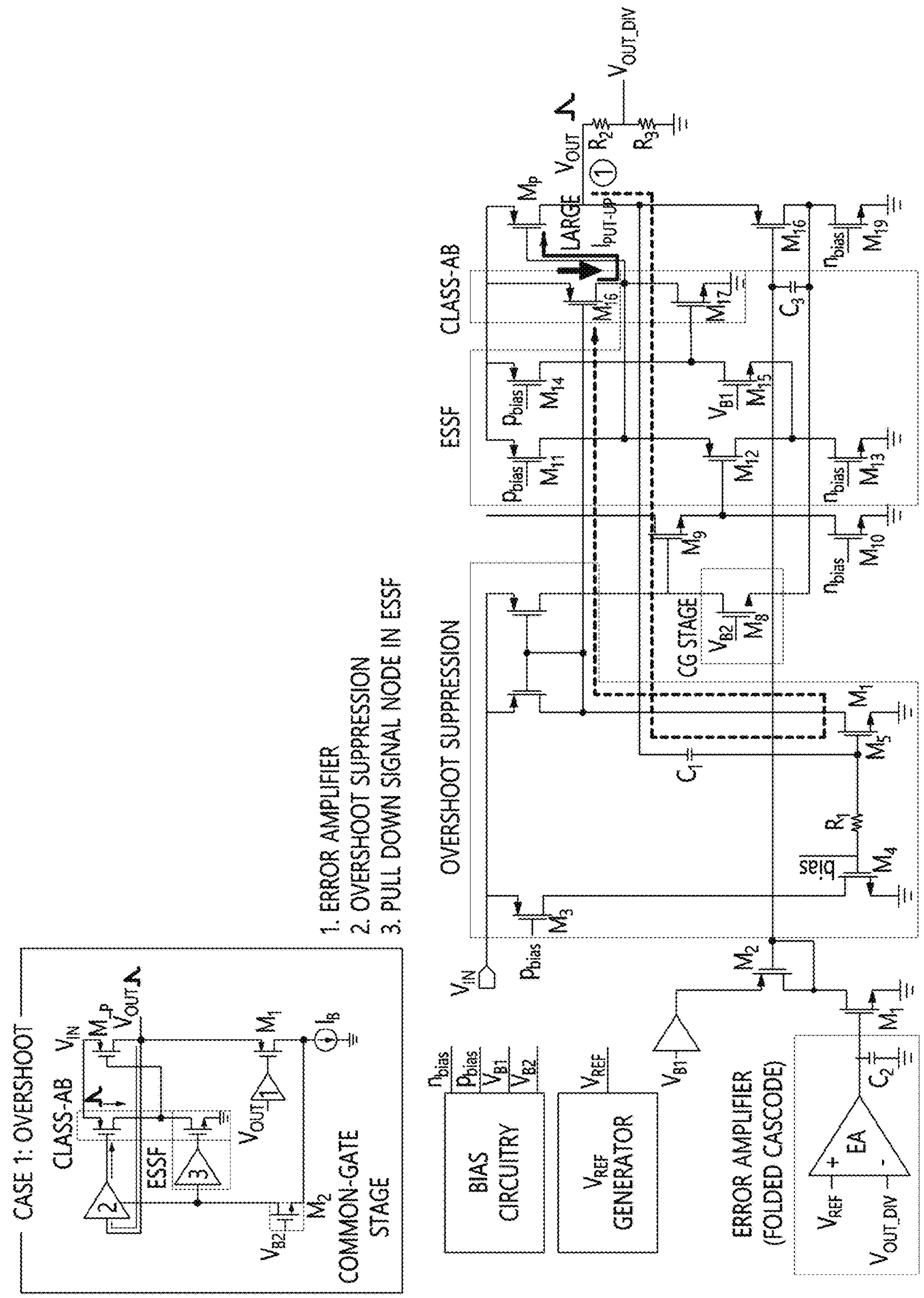
FIG. 10 is a diagram showing the operation in an overshoot situation of FIG. 9.
Figure 11:
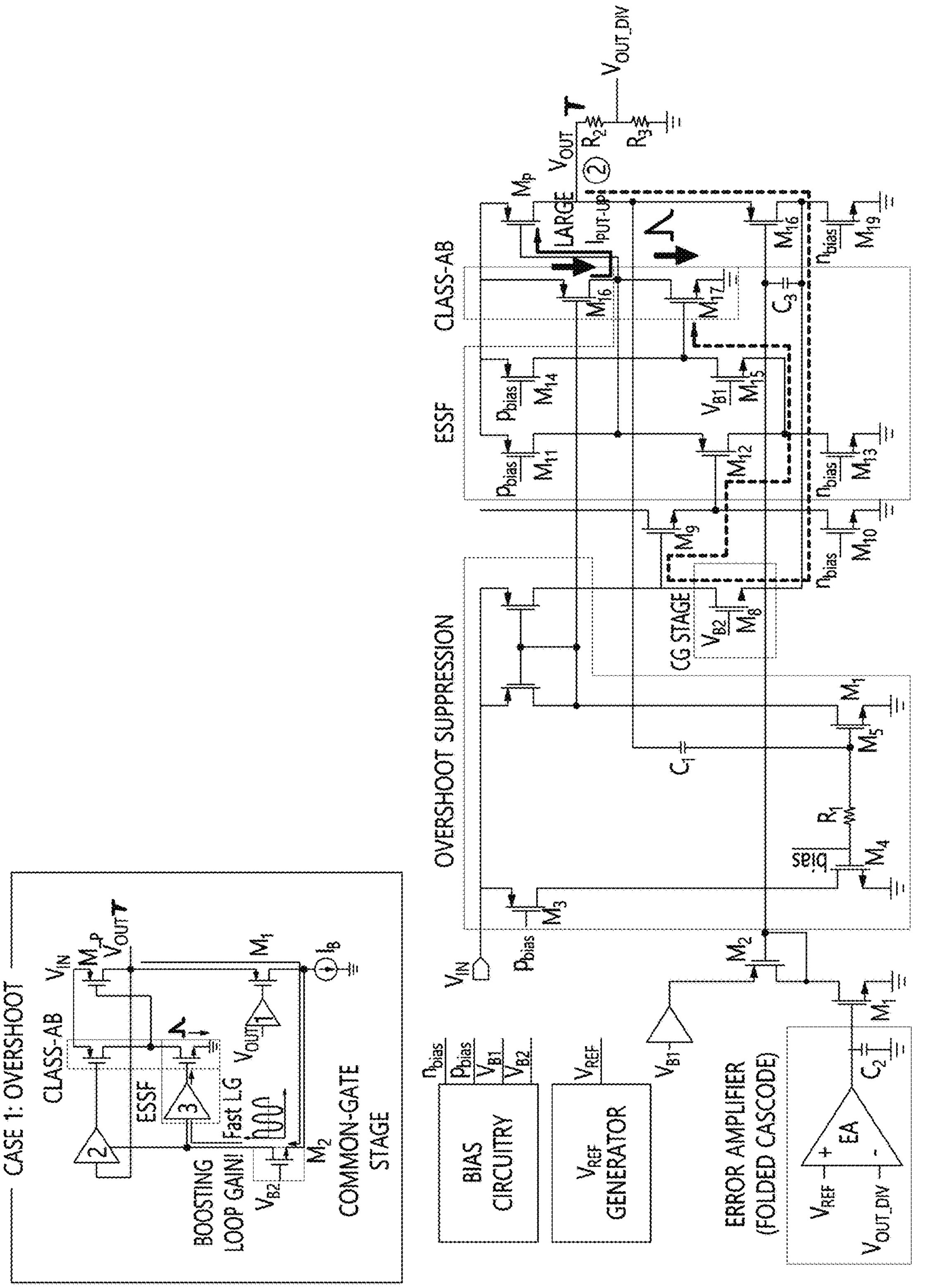
FIG. 11 is a diagram showing the operation in the undershoot situation of FIG. 9.

FIG. 9 is a diagram illustrating an LDO regulator circuit apparatus capable of attenuating supply voltage noise according to another embodiment of the present invention, FIG. 10 is a diagram illustrating the operation in an overshoot situation of FIG. 9, and FIG. 11 is a diagram illustrating the operation in an undershoot situation of FIG. 9.

Referring to FIGS. 9 to 11, the LDO regulator circuit apparatus capable of attenuating supply voltage noise according to another embodiment of the present invention comprises an error amplifying circuit unit 910, a control circuit unit 920, an overshoot suppression circuit unit 930, a CG circuit unit 940, an ESSF circuit unit 950, a class AB circuit unit 960, and an FVF regulator circuit unit 970.

Overlapping descriptions of the configurations already described in FIGS. 6 and 7 will be omitted, and the description will focus on the different configurations compared to FIGS. 6 and 7.

Compared to FIG. 7, the LDO regulator circuit apparatus capable of attenuating supply voltage noise according to another embodiment of the present invention comprises a class AB circuit unit 960 that pulls up or down the gate node of the pass transistor $M_{PASS}$.

The class AB circuit unit 960 may comprise a first switch transistor $M_{16}$ and a second switch transistor $M_{17}$.

The first switch transistor $M_{16}$ may be turned on in an overshoot situation of the output voltage and pull up the gate node of the pass transistor $M_{PASS}$ by generating a pull-up signal through the overshoot suppression circuit on the first path.

The second switch transistor $M_{17}$ may be turned on in an undershoot situation and pull down the gate node of the pass transistor $M_{PASS}$ by boosting the gain of the fast loop.

Figure 12:
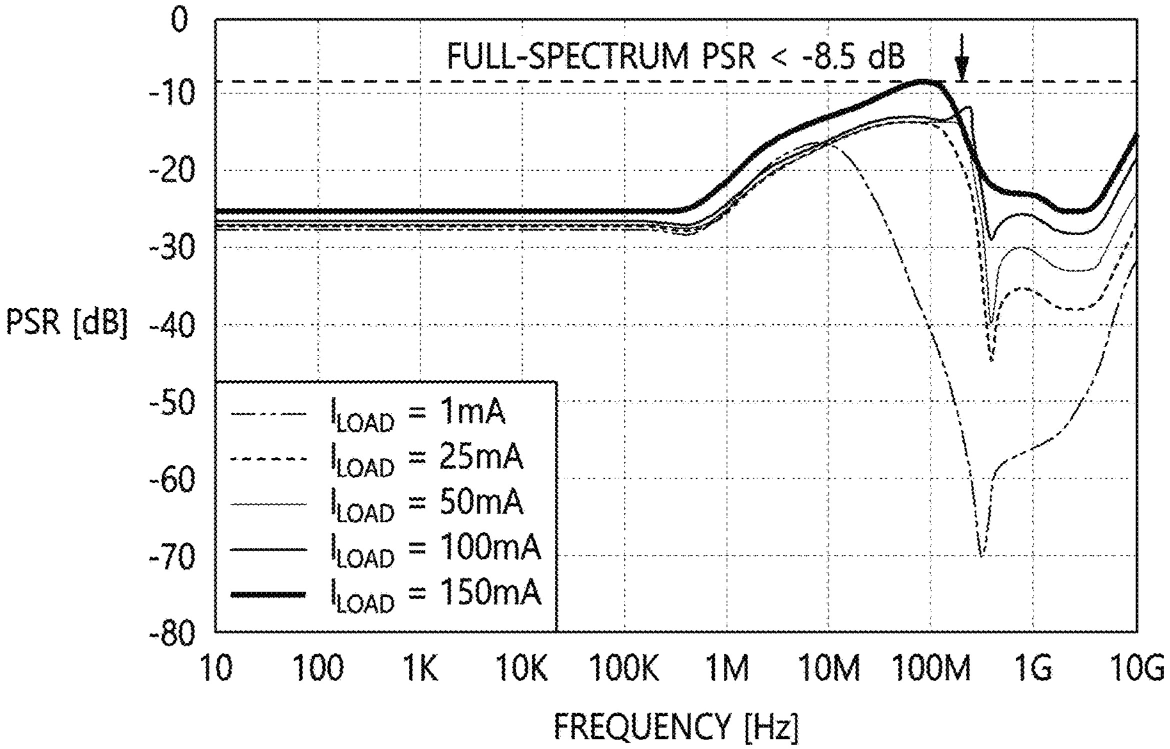
FIG. 12 is a diagram showing the results of simulating the supply voltage noise removal ability of FIG. 9.

In addition, even when there is a load current of 150 mA or more, supply voltage noise can be removed for all frequency ranges (10 Hz to 10 GHZ) and a peak current efficiency of 99.5% has been achieved. As shown in FIG. 12, in the worst case even with a load current of 150 mA, it showed the ability to remove supply voltage noise of more than −8.5 dB across the entire frequency band.

Figure 13:
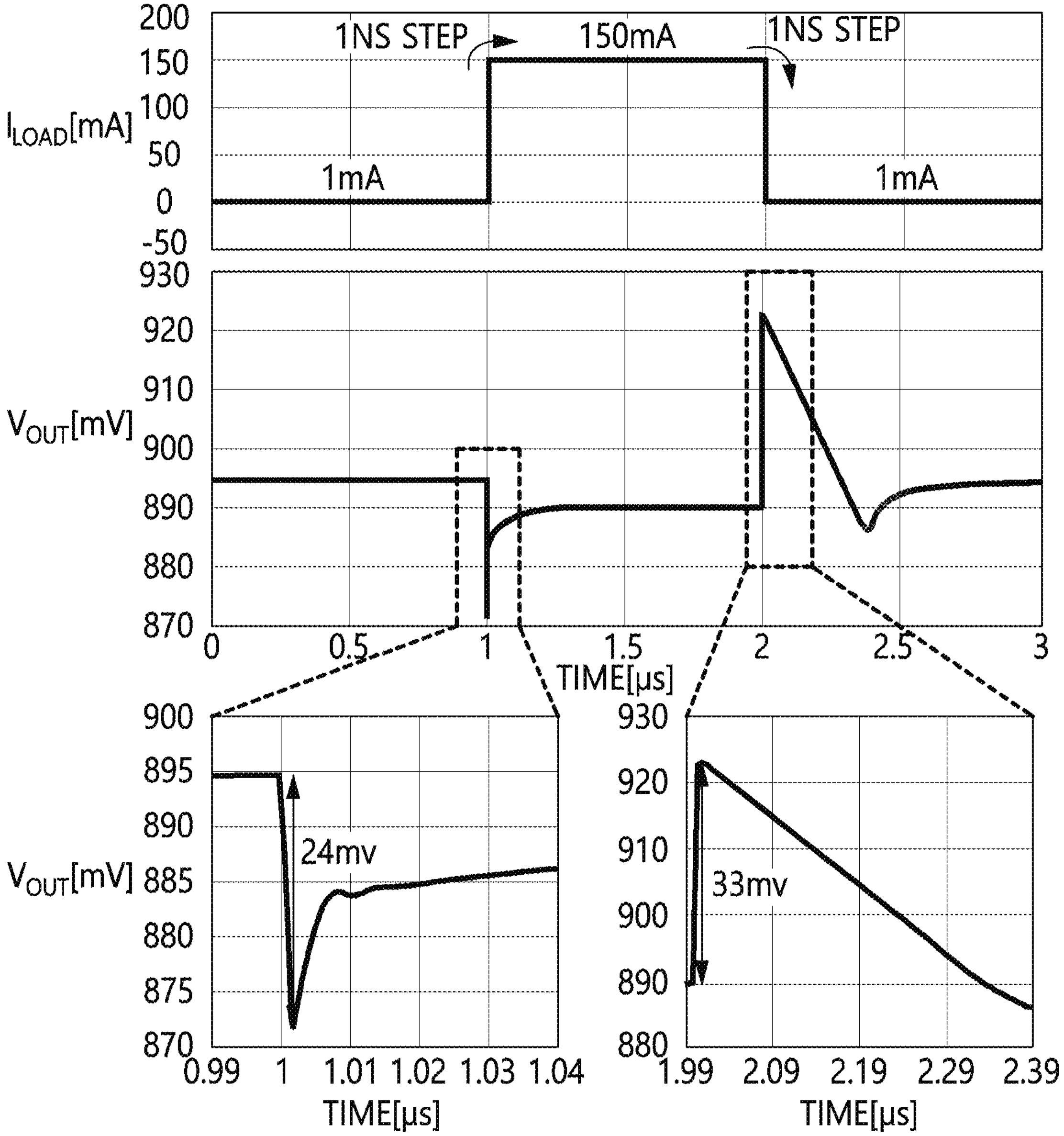
FIG. 13 is a diagram showing the results of simulating the transient response of FIG. 9.

An LDO regulator circuit apparatus capable of attenuating supply voltage noise according to another embodiment of the present invention uses an overshoot suppression method based on the class AB circuit unit 960 to achieve fast transient response not only in the undershoot situation but also in the overshoot situation, in which overshoot voltages are 16 mV and 21 mV, respectively. As shown in FIG. 13, it can be seen that due to the overshoot suppression circuit unit, there is no significant difference in voltage change in an overshoot situation compared to an undershoot situation.

FIG. 14 shows the results of comparing the performance of the LDO regulator circuit apparatus capable of attenuating supply voltage noise of FIG. 9 with the prior art. As shown in FIG. 14, the LDO regulator circuit apparatus capable of attenuating supply voltage noise according to an embodiment of the present invention can reduce supply voltage noise across all frequency bands even if the load current is greater than 100 mA. In addition, it can be seen that the transient response speed has been improved.

The present invention has been described focusing on its embodiments. A person skilled in the art to which the present invention pertains will understand that the present invention may be implemented in a modified form without departing from the essential characteristics of the present invention. Therefore, the disclosed embodiments should be considered from an illustrative rather than a restrictive perspective. The scope of the present invention is indicated in the claims rather than the foregoing description, and all differences within the equivalent scope should be construed as being included in the present invention.

The invention claimed is:

1. An LDO regulator circuit apparatus capable of attenuating supply voltage noise comprising:

a flipped voltage follower (FVF) regulator circuit unit having a pass transistor $M_{PASS}$ configured to adjust a supply voltage to output an output voltage;

an error amplifying circuit unit configured to receive and compare a reference signal ($V_{REF}$) and a feedback voltage ($V_{OUT\_DIV}$), wherein the feedback voltage is fed back from the output voltage through a feedback loop;

a common gate (CG) circuit unit configured to amplify a feedback loop gain of the flipped voltage follower (FVF) regulator circuit unit;

a super source follower circuit unit configured to buffer an output of the CG circuit unit and transmit it to a gate node of the pass transistor ($M_{PASS}$); and a control circuit unit configured to transmit an output of the error amplifying circuit unit to a gate node of a transistor $M_{CTRL}$ according to a bias voltage, wherein the flipped voltage follower (FVF) regulator circuit unit comprises the transistor $M_{CTRL}$ Whose gate node is an input terminal of the flipped voltage follower (FVF) regulator circuit unit; and a transistor $M_{BIAS}$ operating as a current source, wherein a drain node of the pass transistor $M_{PASS}$ is connected to a source node of a transistor $M_{CTRL}$, a drain node of the transistor $M_{CTRL}$ is connected to a drain node of a transistor $M_{BIAS}$, and a source node of the transistor $M_{BIAS}$ is connected to ground, wherein the control circuit unit has a transistor $M_{N1}$ and a transistor $M_{P1}$, wherein a bias voltage ($V_{B1}$) is applied to a source node of the transistor $M_{P1}$, and a gate node of the transistor $M_{P1}$ is connected to the gate node of the transistor $M_{CTRL}$, wherein a gate node of the transistor $M_{N1}$ receives an output signal of the error amplifying circuit unit, the source node is connected to the ground, and the drain node is connected to a drain node of the transistor $M_{P1}$.

2. The LDO regulator circuit apparatus of claim 1, wherein the CG (common gate) circuit unit comprises a transistor $M_{N2}$, wherein a source node of the transistor $M_{N2}$ is connected to a drain node of the transistor $M_{CTRL}$, and an output of the drain node of the transistor $M_{CTRL}$ is amplified according to a bias voltage ($V_{B2}$) applied to a gate node of the transistor $M_{N2}$ and transmitted to the super source follower circuit unit.

3. The LDO regulator circuit apparatus of claim 1 further comprising, a transistor $M_{N4}$ configured to buffer an output of the CG circuit unit to an input of the super source follower circuit unit.

4. The LDO regulator circuit apparatus of claim 3, wherein the super source follower circuit unit comprises, transistors $M_{P4}$ and $M_{P5}$ configured to receive the supply voltage at a source node, transistors $M_{N5}$ and $M_{N6}$ whose source nodes are connected to ground, and a transistor $M_{P3}$ whose gate node is connected to a source node of the transistor $M_{N4}$, wherein a contact node, in which a drain node of the transistor $M_{P4}$ and a source node of the transistor $M_{P3}$ are connected, and the contact node, in which a drain node of the transistor $M_{P5}$ and a drain node of the transistor $M_{N6}$ are connected, are respectively connected to a gate node of the pass transistor $M_{PASS}$.

5. An LDO regulator circuit apparatus capable of attenuating supply voltage noise comprising:

a flipped voltage follower (FVF) regulator circuit unit having a pass transistor $M_{PASS}$ configured to adjust a supply voltage to output an output voltage;

an error amplifying circuit unit configured to receive and compare a reference signal ($V_{REF}$) and a feedback voltage ($V_{OUT\_DIV}$), wherein the feedback voltage is fed back from the output voltage through a feedback loop;

a common gate (CG) circuit unit configured to amplify a feedback loop gain of the flipped voltage follower (FVF) regulator circuit unit;

a super source follower circuit unit configured to buffer an output of the CG circuit unit and transmit it to a gate node of the pass transistor $M_{PASS}$; and a class AB circuit unit located between the pass transistor $M_{PASS}$ and the super source follower circuit unit and configured to pull up or pull down a gate node of the pass transistor $M_{PASS}$ in an overshoot or undershoot situation of the output voltage.

6. The LDO regulator circuit apparatus of claim 5, wherein the class AB circuit unit comprises, a first switch transistor configured to be turned on in an overshoot situation of the output voltage and pull up a gate node of the pass transistor $M_{PASS}$ by generating a pull-up signal through an overshoot suppression circuit unit on a first path; and a first switch transistor configured to be turned on in an undershoot situation of the output voltage and pull down a gate node of a pass transistor $M_{PASS}$ by boosting a gain of a fast loop.

* * * * *